United States Patent Office 3,203,988
Patented Aug. 31, 1965

3,203,988
CYCLOALKYLOXYALKYL GUANIDINE
COMPOUNDS
Alfred Campbell, Ann Arbor, Mich., assignor to Parke,
Davis & Company, Detroit, Mich., a corporation of
Michigan
No Drawing. Filed Nov. 23, 1962, Ser. No. 239,799
9 Claims. (Cl. 260—564)

The present invention relates to novel cycloalkyloxyalkylguanidines, to acid-addition salts thereof, and to methods for the production of such compounds. More particularly, the invention relates to cycloalkyloxyalkylguanidines, which can be represented in their free base form by the formula

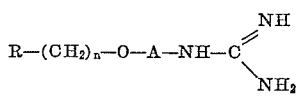

where R is a cycloalkyl group, a lower alkyl substituted cycloalkyl group, or a lower alkoxy substituted cycloalkyl group, said cycloalkyl group containing between 3 and 8 carbon atoms, and said lower alkyl and lower alkoxy substituents containing fewer than 4 carbon atoms, $n$ is 0 or 1, and A represents a lower alkylene radical of 2, 3, or 4 carbon atoms, separating the groups to which it is attached by at least 2 carbon atoms. Some examples of lower alkylene radicals which A can represent are ethylene, trimethylene, propylene and butylene.

The products of the invention can be obtained in the free base form having the formula given above or in the form of one of their acid-addition salts with inorganic or organic acids. Some representative non-toxic acid-addition salts are the hydrochloride, hydrobromide, hydroiodide, hemisulfate, nitrate, phosphate, citrate, acetate, tartrate, salicylate, benzoate, benzenesulfonate, and the like.

When the products of the invention are obtained as acid-addition salts, these salts are converted into their free base form by making an aqueous solution of the acid-addition salt basic with a base such as sodium hydroxide or potassium hydroxide. Alternatively, the free base form can be obtained by passing an aqueous solution of the acid-addition salt over a strongly basic anion (hydroxide ion) exchange resin such as Amberlite IRA–400 [OH⁻] resin and the like, eluting with aqueous alcohol, and evaporating the solution to dryness. Formation of the various salts envisioned by and included in this invention can be carried out by reacting the selected free base with the selected acid in an unreactive solvent or by reacting the free base with an excess of aqueous acid, whereby the excess aqueous acid serves as solvent for the reaction. In either reaction, subsequent evaporation of the solution to dryness yields the desired salt. Further, the acid-addition salts can be interconverted by passing them over the desired anionic form of a strongly basic ion exchange resin such as Amberlite IRA–400 and the like. Thus, if the novel cycloalkyloxyalkylguanidines are isolated as their nitrate acid-addition salts, these nitrate salts can be converted into the corresponding hemisulfate salts by passing them over a strongly basic $[SO_4^=]$ ion exchange resin such as Amberlite IRA–400 $[SO_4^=]$ resin. Similarly, the nitrate salts can be converted into the corresponding hydrochloride salts by passing them over a strongly basic [Cl⁻] ion exchange resin such as Amberlite IRA–400 [Cl⁻] resin.

In accordance with the invention, the new cycloalkyloxyalkylguanidines can be produced by reacting a compound of the formula

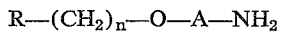

wherein R, $n$, and A have the same significance as above, with an acid-addition salt of a reactive guanidine compound of the formula

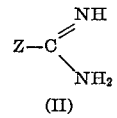

(II)

wherein Z represents any easily displaceable moiety. For purposes of this invention, such moieties are: hydrocarbonthio, hydrocarbonoxy, unsubstituted, mono- or polysubstituted unsaturated nitrogen heterocyclic radicals containing at least two nitrogen atoms in their ring systems and connected to the guanidine carbon atom through nitrogen, and other displaceable radicals. Some examples are: lower alkylthio radicals such as methylthio and ethylthio; lower alkyloxy radicals such as methoxy and ethoxy; pyrazolyl; substituted pyrazolyl radicals such as dialkylpyrazolyl; alkyl-aryl-pyrazolyl, and dialkylmonohalopyrazolyl; imidazolyl; triazolyl; and tetrazolyl. The reaction can be conveniently carried out by contacting the reactants either in the absence of a solvent or in the presence of unreactive solvents such as water, alcohols, chlorobenzene, dimethylformamide, and the like. The preferred solvent is water or a mixture of ethanol and water which may be varied widely in its composition. Equimolar quantities of reactants are usually used in this reaction although an excess of either reagent is not harmful. Preferably a slight excess of amine is employed. The reaction is usually carried out at a temperature of between 20–150° C. although satisfactory results can also be obtained somewhat outside of this temperature range. The preferred reaction temperature is 75–120° C. The product is isolated directly as an acid-addition salt or, following treatment with a base, as the corresponding free base.

In carrying out the foregoing process a preferred method involves reacting an acid-addition salt of 3,5-dimethyl-1-guanylpyrazole, a salt corresponding to Formula II wherein

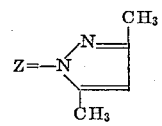

with a cycloalkyloxyalkylamine of Formula I, whereby the products of this invention are isolated directly as their acid-addition salts. If 3,5-dimethyl-1-guanylpyrazole nitrate is used in this reaction cycloalkyloxyalkylguanidine nitrates are obtained. These nitrates can be converted to the corresponding free bases or to other acid-addition salts by procedures discussed earlier.

Another preferred method for carrying out the foregoing process involves reacting an acid-addition salt of 2-methyl-2-thiopseudourea (a salt corresponding to Formula II wherein Z is a methylthio radical) with a cycloalkyloxyalkylamine of Formula I, whereby the products of this invention are isolated directly as acid-addition salts. If 2-methyl-2-thiopseudourea hemisulfate is used in this reaction, cycloalkyloxyalkylguanidine hemisulfates are obtained. Conversion to the corresponding free bases or to other acid-addition salts is accomplished by methods hereinbefore described.

In accordance with a second process, compounds of the invention can be prepared by reacting a cycloalkyloxyalkylamine of Formula I, preferably as an acid-addition salt such as the hydrobromide or nitrate, with cyanamide or dicyandiamide. The reaction can be conveniently carried out by contacting the reactants either in the absence of a solvent or in the presence of unreactive solvents such as water, alcohols, chlorobenzene, dimethylformamide, and the like. When cyanamide is used as the active intermediate, fusion techniques, in the absence of solvents, can be conveniently employed. In such a reaction the cyanamide and a salt of a cycloalkyloxyalkylamine of Formula I are mixed together and heated to the point of fusion. Equimolar quantities of reactants are usually used in this reaction although an excess of either reagent is not harmful. Preferably a slight excess of amine salt is employed. The temperature of the reaction depends upon the fusion point of the reaction mixture. Reaction of the amine salts with cyanamide can also be carried out in aqueous, alcoholic, or non-aqueous solution. Equimolar quantities of reactants are usually used in this reaction although an excess of either reagent is not harmful. Preferably a slight excess of amine salt is employed. The reaction is usually carried out at a temperature of between 20–150° C., although satisfactory results can also be obtained somewhat outside of this temperature range. The preferred temperature range is 75–120° C. When dicyandiamide is employed, the fusion technique described above is preferred.

The starting materials required in the practice of the invention, i.e., the cycloalkyloxyalkylamines of Formula I, can be prepared in a number of ways. According to one method, the amines are prepared by the reduction, by catalytic or chemical means, of cycloalkyloxyalkylnitrile compounds of the formula R—(CH$_2$)$_n$—O—B—CN (III)

where R and $n$ have the same significance as earlier described, and B represents a lower alkylene radical of 1, 2, or 3 carbon atoms. When the reduction is accomplished by catalytic means, the chosen nitrile is hydrogenated under pressure in solution in the presence of a suitable hydrogenation catalyst, such as Raney nickel/cobalt. The reduction is carried out chemically by reacting the chosen nitrile with a metal hydride, such as lithium aluminum hydride, in a inert anhydrous organic solvent, and hydrolyzing the reaction product. The nitriles of Formula III, wherein B is the ethylene radical, are conveniently prepared by the cyanoethylation of alcohols of the formula R—(CH$_2$)$_n$—OH (IV)

where R and $n$ have the aforementioned significance. The nitriles of Formula III, wherein B contains 2 or 3 carbon atoms, can be prepared by reacting one equivalent of a metal alcoholate of the formula R—(CH$_2$)$_n$—O$^-$M$^+$ (V)

with an alkylene dihalide of the formula

X—(CH$_2$)$_y$—X (VI)

followed by reaction of the intermediate halo-ether with a metal cyanide, such as potassium cyanide, where X represents bromine, chlorine or iodine, M represents an alkali metal, $y$ is 2 or 3, and R and $n$ have the aforementioned significance.

The cycloalkyloxyalkylamines of Formula I, wherein R is a cyclohexyl or a lower alkyl substituted cyclohexyl group, can also be prepared by the catalytic hydrogenation of phenoxyalkylamine compounds of the formula

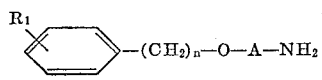

wherein R$_1$ is hydrogen or a lower alkyl substituent containing not more than 4 carbon atoms and $n$ and A have the aforementioned significance.

The compounds of this invention are valuable as pharmacological agents, and especially as adrenergic neurone blocking agents. They exhibit anti-hypertensive activity. They may be administered orally or parenterally. Oral administration is preferred.

The invention is illustrated by the following examples:

*Example 1*

A solution of 8.6 g. of 3-(cyclopentyloxy)-propylamine and 10 g. of 3,5-dimethyl-1-guanylpyrazole nitrate in 100 ml. water is heated under reflux for two hours. After cooling, the precipitate of 3-(cyclopentyloxy)-propylguanidine nitrate is isolated by filtration and recrystallized from a mixture of ethanol and ether; M.P. 86–87° C.

By employing the procedure described above, approximately equimolar quantities of the specified cycloalkyloxyalkylamine and 3,5-dimethyl-1-guanylpyrazole nitrate are reacted to give the product specified below:

(a) From 3-(2-methylcyclohexyloxy)-propylamine is obtained 3-(2-methylcyclohexyloxy)-propylguanidine nitrate; M.P. 92–93° C. after recrystallization from a mixture of ethanol and ether.

(b) From 3-(3-methylcyclohexyloxy)-propylamine is obtained 3-(3-methylcyclohexyloxy)-propylguanidine nitrate; M.P. 66–67° C. after recrystallization from a mixture of propanol and ether.

(c) From 3-(cycloheptyloxy)-propylamine is obtained 3-(cycloheptyloxy)-propylguanidine nitrate; M.P. 103–104° C. after recrystallization from a mixture of ethanol and ether.

(d) From 3-(cyclooctyloxy)-propylamine is obtained 3-(cyclooctyloxy)-propylguanidine nitrate; M.P. 110–111.5° C. after recrystallization from a mixture of methanol and ether.

A cooled aqueous solution of 3-(cyclopentyloxy)-propylguanidine nitrate is made basic with sodium hydroxide, the basic solution is extracted twice with ether, the ether solution is dried over anhydrous sodium sulfate, and the solvent is removed under reduced pressure to give 3-(cyclopentyloxy)-propylguanidine as the free base; B.P. 138–141° C./0.4 mm. Hg.

The preparation of the amines used as starting materials can be illustrated by the preparation of 3-(cyclopentyloxy)-propylamine as follows:

Acrylonitrile (110 g.) is added dropwise to a stirred solution of 40% methanolic trimethylbenzylammonium methoxide (3 ml.) in cyclopentanol (172 g.). The temperature of the reaction mixture is maintained at 45–50° C. by external cooling. After several hours of stirring at room temperature, the reaction mixture is acidified with glacial acetic acid and fractionally distilled under reduced pressure to give β-(cyclopentyloxy)-propionitrile; B.P. 108–110° C./13 mm. Hg. β-(cyclopentyloxy)-propionitrile (25 g.) is hydrogenated in the presence of Raney nickel/cobalt catalyst (5 g.) in toluene (100 ml.) at a pressure of 1900 pounds per square inch and a temperature of 100° C. until the theoretical amount of hydrogen is absorbed. After filtration to remove the catalyst, fractional distillation under reduced pressure gives 3-(cyclopentyloxy)-propylamine; B.P. 85–87° C./11 mm. Hg.

The following amines can be prepared in a similar manner:

3-(cycloheptyloxy)-propylamine; B.P. 70–74° C./0.3 mm. Hg.

3-(cyclooctyloxy)-propylamine; B.P. 75–77° C./0.3 mm. Hg.

*Example 2*

A solution of 19.1 g. of 3-(4-methylcyclohexyloxy)-propylamine and 13.9 g. of 3,5-dimethyl-1-guanylpyrazole nitrate in 100 ml. of water is heated under reflux for 2 hours. After cooling, the crystallized product, 3-(4-methylcyclohexyloxy)-propylguanidine nitrate, is isolated by filtration and recrystallized from a mixture of ethanol and ether; M.P. 68–69° C.

By employing the procedure described above, approximately equimolar quantities of the specified cycloalkyloxyalkylamine and 3,5-dimethyl-1-guanylpyrazole nitrate are reacted to give the product specified below:

(a) From 2-(cyclohexyloxy)-ethylamine is obtained 2-(cyclohexyloxy)-ethylguanidine nitrate; M.P. 55–56° C. after recrystallization from a mixture of acetonitrile and ether.

(b) From 2-(cyclohexyloxy)-propylamine is obtained 2 - (cyclohexyloxy) - propylguanidine nitrate; M.P. 102–105° C. after recrystallization from a mixture of methanol and ether.

(c) From 4-(cyclohexyloxy)-butylamine is obtained 4-(cyclohexyloxy)-butylguanidine nitrate; M.P. 72–73° C.

The preparation of the amines used as starting materials in the method of this example can be illustrated by the preparation of 3-(4-methylcyclohexyloxy)-propylamine as follows:

A solution of 3-(p-tolyloxy)-propylamine (16.5 g.) in 100 ml. of methanol and 20 ml. of acetic acid is hydrogenated in the presence of a 10% rhodium-1% platinum on charcoal catalyst at 100° C. under 50 pounds per square inch pressure until the theoretical amount of hydrogen is absorbed. After filtration, the methanol is removed by distillation, an excess of 15% aqueous sodium hydroxide is added to the residue, and the basic residue is extracted with ether. The ether solution is dried over anhydrous sodium sulfate, and the dried solution is fractionally distilled under reduced pressure to give 3-(4 - methylcyclohexyloxy) - propylamine; B.P. 53–55° C./0.5 mm. Hg.

*Example 3*

A solution of 7.8 g. of 3 - (cyclohexyloxy) - propylamine and 14.5 g. of 3-methyl-5-phenyl-1-guanylpyrazole hemisulfate in 100 ml. of water is heated under reflux for two hours. After cooling, the precipitate of 3-(cyclohexyloxy)-propylguanidine hemisulfate is isolated by filtration and recrystallized from a mixture of methanol and ether; M.P. 225–226° C.

*Example 4*

To a solution of 7 g. of 3-(cyclopentyloxy)-propylamine in 20 ml. of 75% aqueous ethanol is added a solution of 9.4 g. of 2-methyl-2-thiopseudourea hemisulfate in 30 ml. of water, and the resulting mixture is heated under reflux for one hour. The mixture is then evaporated to dryness under reduced pressure and the residue of 3 - (cyclopentyloxy) - propylguanidine hemisulfate is crystallized from a mixture of methanol and ether.

By the same procedure, equivalent amounts of 3-(cyclohexyloxy)-propylamine and 2-methyl - 2 - thiopseudourea hemisulfate are reacted to give 3-(cyclohexyloxy)-propylguanidine hemisulfate, M.P. 225–226° C.

*Example 5*

To a solution of 7 g. of 3-(cyclohexyloxy)-propylamine in 20 ml. of 75% aqueous ethanol is added a solution of 5.6 g. of 2-methyl-2-thiopseudourea sulfate in 20 ml. of water, and the resulting mixture is heated under reflux for one hour. The mixture is then evaporated to dryness under reduced pressure and the residue of 3-(cyclohexyloxy)-propylguanidine hemisulfate is crystallized from a mixture of methanol and ether; M.P. 225–226° C.

By the same procedure two moles of 3-(4-methoxycyclohexyloxy)-propylamine are reacted with one mole of 2-methyl-2-thiopseudourea sulfate to give 3-(4-methoxycyclohexyloxy) - propylguanidine hemisulfate; M.P. 185–187° C. after recrystallization from a mixture of methanol and ether.

A cooled aqueous solution of 15 g. of 3-(cyclohexyloxy)-propylguanidine hemisulfate is made basic with sodium hydroxide, the basic solution is extracted twice with ether, the ether solution is dried over anhydrous sodium sulfate, and the solvent is removed from the dried solution under reduced pressure to give 3-(cyclohexyloxy)-propylguanidine as the free base; B.P. 143–145° C./0.3 mm. Hg.

*Example 6*

To a solution of 9.2 g. of 3-(2-n-propylcyclohexyloxy)-propylamine in 25 ml. of aqueous ethanol is added a solution of 7.0 g. of 2-methyl-2-thiopseudourea sulfate in 25 ml. of water, and the resulting mixture is heated under reflux for one hour. The mixture is then evaporated to dryness under reduced pressure, and the residue of 3-(2-n-propylcyclohexyloxy) - propylguanidine hemisulfate is crystallized from ethanol; M.P. 283° C.

The 3-(2-n-propylcyclohexyloxy)-propylamine used as starting material is prepared as follows:

Acrylonitrile (55 g.) is added dropwise to a stirred solution of 40% methanolic trimethylbenzylammonium methoxide (1.5 ml.) in 142 g. of 2-n-propylcyclohexanol. The temperature of the reaction mixture is maintained at 45–50° C. by external cooling. After several hours of stirring at room temperature, the reaction mixture is acidified with glacial acetic acid and fractionally distilled under reduced pressure to give β-(2-n-propylcyclohexyloxy)-propionitrile; B.P. 150–155° C./0.3 mm. Hg. A solution of 25 g. of β-(2-n-propylcyclohexyloxy)-propionitrile in 300 ml. of dry ether is added dropwise to a slurry of 12 g. of lithium aluminum hydride in ether. When the addition is complete, the mixture is cooled in an ice bath while first 12 ml. of water, then 12 ml. of 15% aqueous sodium hydroxide solution, and finally 36 ml. of water are carefully added. The mixture is filtered, the ethereal solution is separated, dried, and distilled to give 3-(2-n-propylcyclohexyloxy)-propylamine; B.P. 115–118° C./0.2 mm. Hg.

*Example 7*

To a solution of 7 g. of 3 - (cyclopentylmethoxy)-propylamine in 20 ml. of aqueous ethanol is added a solution of 5.6 g. of 2-methyl-2-thiopseudourea sulfate in 20 ml. of water, and the resulting mixture is heated under reflux for one hour. The mixture is then evaporated to dryness under reduced pressure and the residue of 3-(cyclopentylmethoxy)-propylguanidine hemisulfate is crystallized from a mixture of methanol and ether; M.P. 224–225° C.

By employing the procedure described above, the following substituted guanidines can be prepared from two moles of the specified cycloalkylmethoxyalkylamine and one mole of 2-methyl-2-thiopseudourea sulfate. The same products are obtained from equimolar amounts of the specified cycloalkylmethoxyalkylamine and 2 - methyl-2-thiopseudourea hemisulfate.

(a) From 3 - (cyclopropylmethoxy) - propylamine is obtained 3-(cyclopropylmethoxy)-propylguanidine hemisulfate; M.P. 163–164° C. after recrystallization from a mixture of methanol and ether.

(b) From 3-(cyclobutylmethoxy)-propylamine is obtained 3-(cyclobutylmethoxy)-propylguanidine hemisulfate; M.P. 211–212° C.

(c) From 3-(cyclohexylmethoxy)-propylamine is obtained 3-(cyclohexylmethoxy)-propylguanidine hemisulfate; M.P. 105°–106° C. after recrystallization from a mixture of ethanol and ether.

(d) From 3 - (cycloheptylmethoxy) - propylamine is obtained 3-(cycloheptylmethoxy)-propylguanidine hemisulfate; M.P. 245–246° C.

(e) From 3 - (2 - methylcyclohexylmethoxy) - propylamine is obtained 3-(2-methylcyclohexylmethoxy-propylguanidine hemisulfate; M.P. 241–242° C.

(f) From 3 - (4-methoxycyclohexylmethoxy) - propylamine is obtained 3-(4-methoxycyclohexylmethoxy)-propylguanidine hemisulfate; M.P. 195–196° C.

The preparation of the amines used as starting materials in the method of this example can be illustrated by the preparation of 3-(cyclohexylmethoxy)propylamine as follows:

Acrylonitrile (55 g.) is added dropwise to a stirred solution of 40% methanolic trimethylbenzylammonium methoxide (1.5 ml.) in 114 g. of cyclohexylmethanol. The temperature of the reaction mixture is maintained at 45–50° C. by external cooling. After several hours of stirring at room temperature, the reaction mixture is acidified with glacial acetic acid and fractionally distilled under reduced pressure to give β-(cyclohexylmethoxy)-propionitrile; B.P. 140–143° C./11 mm. Hg. A solution of 22 g. of β-(cyclohexylmethoxy)-propionitrile in 300 ml. of dry ether is added dropwise to a slurry of 12 g. of lithium aluminum hydride in ether. When the addition is complete, the mixture is cooled in an ice bath while first 12 ml. of water, then 12 ml. of 15% aqueous sodium hydroxide solution, and finally 36 ml. of water are carefully added. The mixture is filtered, the ethereal solution is separated, dried, and distilled to give 3-(cyclohexylmethoxy)-propylamine; B.P. 65–67° C./11 mm. Hg.

The following amines can be prepared in a similar manner:

3 - (cyclopropylmethoxy - propylamine; B.P. 68–70° C./11 mm. Hg.

3 - (cyclobutylmethoxy - propylamine; B.P. 71–72° C./11 mm. Hg.

3 - (cyclopentylmethoxy) - propylamine; B.P. 73–76° C./11 mm. Hg.

3 - (cycloheptylmethoxy) - propylamine; B.P. 124–126° C./11 mm. Hg.

3 - (2 - methylcyclohexylmethoxy)-propylamine; B.P. 110–111° C./11 mm. Hg.

3 - (4 - methoxycyclohexylmethoxy) - propylamine; B.P. 35–136° C./11 mm. Hg.

Example 8

A solution of 19.1 g. of 3-(cyclohexylmethoxy)-propylamine and 13.9 g. of 3,5-dimethyl-1-guanylpyrazole nitrate in 100 ml. of water is heated under reflux for 2 hours. After cooling, the crystallized product, 3-(cyclohexylmethoxy)-propylguanidine nitrate, is isolated by filtration and recrystallized from a mixture of ethanol and ether; M.P. 105–106° C.

Example 9

A solution of 14.2 g. of 3-(cyclopentyloxy)-propylamine and 17.4 g. 3,5-dimethyl-1-guanylpyrazole hydrochloride in 100 ml. of water is heated under reflux for 2 hours. The mixture is then evaporated to dryness under reduced pressure leaving a residue of 3-(cyclopentyloxy)-propylguanidine hydrochloride.

Example 10

To a stirred solution of 15.6 g. of 3-(cyclohexyloxy)-propylamine in 50 ml. of aqueous ethanol is added a solution of 17.1 g. of 2-methyl-2-thiopseudourea hydrobromide in 50 ml. of water, and the resulting mixture is heated under reflux for one hour. The mixture is then concentrated, and the concentrated aqueous solution is passed over a strongly basic [OH⁻] ion exchange resin, eluted with aqueous alcohol, and the solvent removed under reduced pressure leaving 3-(cyclohexyloxy)-propylguanidine; B.P. 143–145° C./0.3 mm. Hg.

Example 11

A solution of 4.2 g. of cyanamide and 23.6 g. of 3-(cyclohexyloxy)-propylamine hydrobromide in 100 ml. of ethanol is heated under reflux for six hours, the solution evaporated to dryness, and the residue triturated with ether leaving 3-(cyclohexyloxy)-propylguanidine hydrobromide.

Example 12

Dicyandiamide (8.4 g.) and 17.9 g. of 3-(cyclopentyloxy)-propylamine hydrochloride are intimately mixed, placed in a round-bottomed flask equipped with a reflux condenser and a thermometer, and the reaction vessel immersed in a mechanically stirred oil bath. The mixture is fused at 180° C. for three hours, subsequently cooled, water added, and the insolubles filtered. The aqueous solution is made alkaline with sodium hydroxide, extracted with ether, the ether solution dried over sodium sulfate, filtered, and evaporated to dryness leaving a residue of 3-(cyclopentyloxy)-propylguanidine; B.P. 138–141° C./0.4 mm. Hg.

Example 13

An aqueous solutioin of 10 g. of 3-(cyclopentyloxy)-propylguanidine hemisulfate is passed over a column containing 60 g. of a strongly basic [Cl⁻] ion exchange resin, the column is eluted with aqueous alcohol, and the solvent is removed under reduced pressure to give 3-(cyclopentyloxy)-propylguanidine hydrochloride.

In a similar manner, 3-(cyclohexyloxy)-propylguanidine hydrobromide is converted into 3-(cyclohexyloxy)-propylguanidine hemisulfate by passing an aqueous solution of 10 g. of the hydrochloride salt over a column containing 60 g. of a strongly basic [SO₄⁼] ion exchange resin, eluting the column with aqueous alcohol and evaporating the solvent.

Example 14

3-(cyclopentyloxy)-proplyguandine (5.0 g.) is dissolved in a 20% excess of 50% aqueous acetic acid and the solution is evaporated to dryness under reduced pressure leaving a residue of 3-(cyclopentyloxy)-propylguanidine acetate.

In a similar manner, 3-(cyclohexyloxy)-propylguanidine acetate is prepared.

Example 15

A 10% aqueous solution of sulfuric acid is added to 5.0 g. of 3-(cyclohexyloxy-propylguanidine in 10 ml. of methanol. Removal of the solvent leaves 3-(cyclohexyloxy)-propylguanidine hemisulfate; M.P. 225–226° C. after recrystallization from a mixture of methanol and ether.

Example 16

To 5.0 g. of 3-(cyclopentyloxy)-propylguanidine in 50 ml. of ether is added a solution of 2.75 g. benzoic acid in 10 ml. of ether. Removal of the solvent leaves 3-(cyclopentyloxy)-propylguanidine benzoate.

I claim:

1. A member of the class consisting of cycloalkyloxy-alkylguanidines of the formula

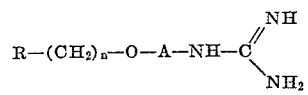

and non-toxic acid-addition salts thereof, where R is chosen from the class consisting of a cycloalkyl group of 3 to 8 carbon atoms and a cycloalkyl group of 3 to 8 carbon atoms substituted by a member of the class consisting of lower alkyl of fewer than 4 carbon atoms and lower alkoxy of fewer than 4 carbon atoms; $n$ is chosen from between 0 and 1; and A represents a lower alkylene radical of 2 to 4 carbon atoms inclusive, separating the groups to which it is attached by at least 2 carbon atoms.

2. A cycloalkyloxyalkylguanidine free base of the formula

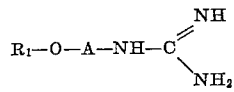

where $R_1$ is a cycloalkyl group of 3 to 8 carbon atoms, and A represents a lower alkylene radical of 2 to 4 carbon atoms, inclusive, separating the groups to which it is attached by at least 2 carbon atoms.

3. 3-(cyclopentyloxy)-propylguanidine.

4. 3-(cyclohexyloxy)-propylguanidine.

5. Non-toxic acid-addition salts of a cycloalkyloxy-alkylguanidine free base of the formula

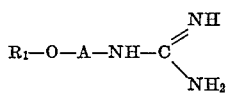

where $R_1$ is a cycloalkyl group of 3 to 8 carbon atoms, and A represents a lower alkylene radical of 2 to 4 carbon atoms, inclusive, separating the groups to which it is attached by at least 2 carbon atoms.

6. 3-(cyclopentyloxy)-propylguanidine hemisulfate.
7. 3-(cyclohexyloxy)-propylguanidine hemisulfate.
8. Non-toxic acid-addition salts of a cycloalkyloxy-alkylguanidine free base of the formula

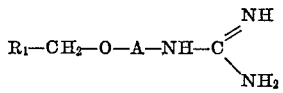

where $R_1$ is a cycloalkyl group of 3 to 8 carbon atoms, and A represents a lower alkylene radical of 2 to 4 carbon atoms, inclusive, separating the groups to which it is attached by at least 2 carbon atoms.

9. 3-(cyclopentylmethoxy) - propylguanidine hemisulfate.

References Cited by the Examiner

Conant et al., "The Chemistry of Organic Compounds," 4th Edition, page 335 (1956).

Harwood, C. A., volume 27, 16764 (1933).

Migrdichian, "Organic Synthesis," volume 1, pages 407–410, (1957).

Scott et al., Nature, volume 169, pages 72–73 (1952).

CHARLES B. PARKER, *Primary Examiner.*